(12) United States Patent
Uchida et al.

(10) Patent No.: US 11,475,711 B2
(45) Date of Patent: Oct. 18, 2022

(54) JUDGEMENT METHOD, JUDGEMENT APPARATUS, AND RECORDING MEDIUM

(71) Applicant: FUJITSU LIMITED, Kawasaki (JP)

(72) Inventors: Akiyoshi Uchida, Akashi (JP); Junya Saito, Kawasaki (JP); Akihito Yoshii, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 17/121,277

(22) Filed: Dec. 14, 2020

(65) Prior Publication Data

US 2021/0216756 A1   Jul. 15, 2021

(30) Foreign Application Priority Data

Jan. 9, 2020   (JP) .............................. JP2020-002383

(51) Int. Cl.
*G06V 40/16* (2022.01)
*G06T 7/73* (2017.01)

(52) U.S. Cl.
CPC .............. *G06V 40/176* (2022.01); *G06T 7/74* (2017.01); *G06V 40/166* (2022.01); *G06T 2207/30201* (2013.01); *G06T 2207/30204* (2013.01)

(58) Field of Classification Search
CPC ........... G06K 7/10722; G06K 9/00288; G06K 9/00221; G06K 9/00335; G06K 9/00268; G06K 9/00302; G06K 9/00315; G06K 9/00255; G06K 9/00281; G06T 2207/30201; G06T 7/12; G06T 2207/20081; G06T 2207/30196; G06T 7/0012; G06T 7/73; G06T 2207/30204; G06T 7/579; G06T 7/33; G06T 7/74;
(Continued)

(56) References Cited

U.S. PATENT DOCUMENTS

2008/0285854 A1* 11/2008 Kotake ..................... G06T 7/73
382/190
2015/0294481 A1* 10/2015 Sakaue .................. A61B 5/112
382/103
(Continued)

FOREIGN PATENT DOCUMENTS

JP        2011-237970 A      11/2011

OTHER PUBLICATIONS

BP4D-Spontaneous: a high-resolution spontaneous 3D dynamic facial expression database (Year: 2014).*
(Continued)

*Primary Examiner* — Nizar N Sivji
(74) *Attorney, Agent, or Firm* — Fujitsu Patent Center

(57) ABSTRACT

A non-transitory computer-readable recording medium stores therein a judgment program that causes a computer to execute a process including acquiring a captured image including a face to which a plurality of markers are attached at a plurality of positions that are associated with a plurality of action units, specifying each of the positions of the plurality of markers included in the captured image, judging an occurrence intensity of a first action unit associated with a first marker from among the plurality of action units based on a judgment criterion of an action unit and a position of the first marker from among the plurality of markers, and outputting the occurrence intensity of the first action unit by associating the occurrence intensity with the captured image.

9 Claims, 11 Drawing Sheets

(58) Field of Classification Search
CPC . G06T 2207/10024; G06T 2207/10048; G06T 7/246
See application file for complete search history.

(56) References Cited

U.S. PATENT DOCUMENTS

| | | | |
|---|---|---|---|
| 2019/0188515 A1* | 6/2019 | Ikeda | G06K 9/42 |
| 2020/0286284 A1* | 9/2020 | Grabli | H04N 5/2224 |
| 2020/0286301 A1* | 9/2020 | Loper | G06T 19/20 |
| 2021/0216821 A1* | 7/2021 | Uchida | G06K 9/00308 |

OTHER PUBLICATIONS

Detecting Happiness Using Hyperspectral Imaging Technology (Year: 2019).*
Design and Implementation of a Vision-based Motion Capture System (Year: 2009).*
Intuitive Face Judgments Rely on Holistic Eye Movement Pattern (Year: 2017).*
Human perception and biosignal-based identification of posed and spontaneous Smiles (Year: 2019).*
A dyadic stimulus set of audiovisual affective displays for the study of multisensory, emotional, social interactions (Year: 2016).*
Recognition of Emotion Intensities Using Machine Learning Algorithms: A Comparative Study (Year: 2019).*
Perception-driven facial expression synthesis (Year: 2012).*
Adjudicating between face-coding models with individual-face fMRI responses (Year: 2015).*
Xing Zhang et al., "BP4D-Spontaneous: a High-resolution Spontaneous 3D Dynamic Facial Expression Database" Elsevier Image and Vision Computing 32 (2014) pp. 692-706, Jul. 14, 2014 (Total 15 pages).

* cited by examiner

FIG.5
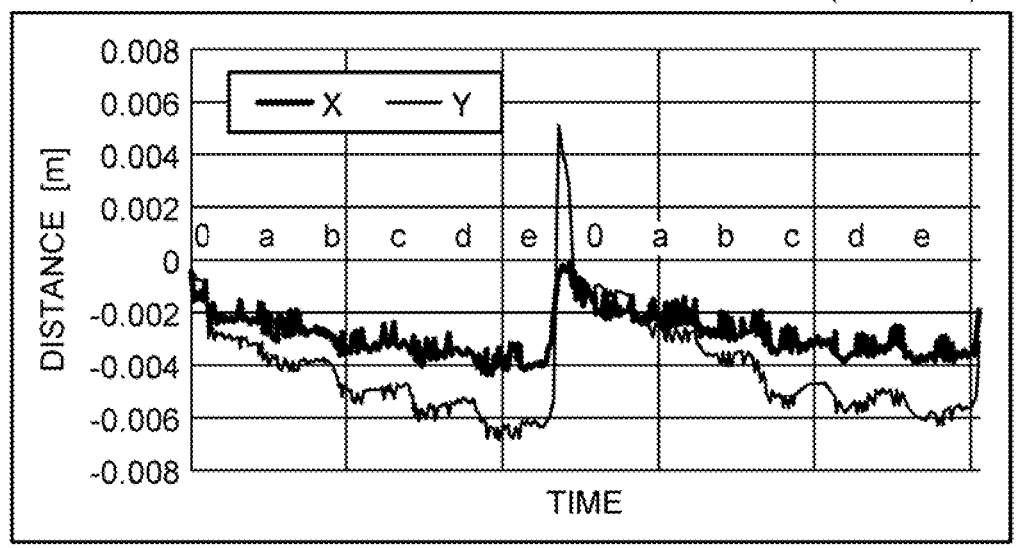
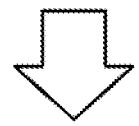
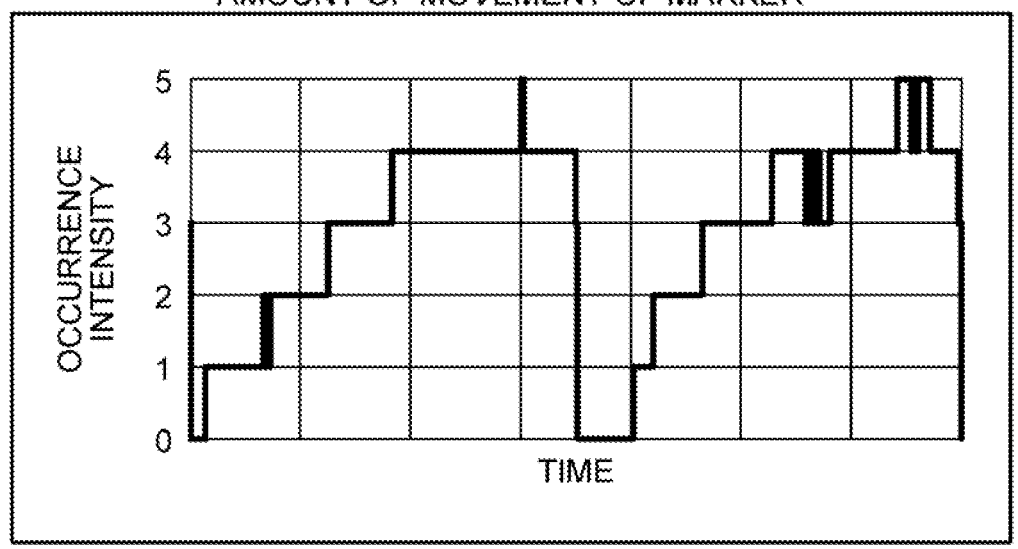

JUDGEMENT METHOD, JUDGEMENT APPARATUS, AND RECORDING MEDIUM

CROSS-REFERENCE TO RELATED APPLICATION

This application is based upon and claims the benefit of priority of the prior Japanese Patent Application No. 2020-002383, filed on Jan. 9, 2020, the entire contents of which are incorporated herein by reference.

FIELD

The embodiments discussed herein are related to judgment technique.

BACKGROUND

In nonverbal communication, expressions play an important role. An expression estimating technique is indispensable for understanding and sensing persons. A technique called an action unit (AU) is known as a tool for estimating expressions. AU is a technique for quantifying and disassembling expressions based on facial regions and muscles of facial expressions.

An AU estimating engine is constructed based on machine learning formed based on a large amount of teacher data. Image data of facial expressions, and Occurrence (presence or absence of occurrence) and Intensity (occurrence intensity) of each of AUs are used as teacher data. Furthermore, Occurrence and Intensity in teacher data are subjected to annotation by specialists called coders.

For example, a related technique is disclosed in Japanese Laid-open Patent Publication No. 2011-237970.

Another related technique is disclosed in X. Zhang, L. Yin, J. Cohn, S. Canavan, M. Reale, A. Horowitz, P. Liu, and J. M. Girard, "BP4D-Spontaneous: a high-resolution spontaneous 3D dynamic facial expression database" *Image and Vision Computing*, 32, 2014. 1, 692-706.

SUMMARY

According to an aspect of the embodiments, a non transitory computer-readable recording medium stores therein a judgment program that causes a computer to execute a process including: acquiring a captured image including a face to which a plurality of markers are attached at a plurality of positions that are associated with a plurality of action units; specifying each of the positions of the plurality of markers included in the captured image; judging an occurrence intensity of a first action unit associated with a first marker from among the plurality of action units based on a judgment criterion of an action unit and a position of the first marker from among the plurality of markers; and outputting the occurrence intensity of the first action unit by associating the occurrence intensity with the captured image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a judgment method of occurrence intensities;

DESCRIPTION OF EMBODIMENTS

However, with the related technique, it is difficult to judge AUs from a facial image, and, as a result, there is a problem in that there may sometimes be a case in which it is difficult to generate teacher data that is used to estimate AUs. For example, cost and time are needed for annotation performed by coders; therefore, it is difficult to generate a large amount of data. Furthermore, it is difficult to accurately find a small change by measuring a movement of each of the facial regions by performing image processing on the facial image, and it is thus difficult for a computer to judge AUs from the facial image without judgment by persons.

Preferred embodiments will be explained with reference to accompanying drawings. Furthermore, the present invention is not limited to the embodiments. Furthermore, each of the embodiments can be used in any appropriate combination as long as processes do not conflict with each other.

Figure 1:
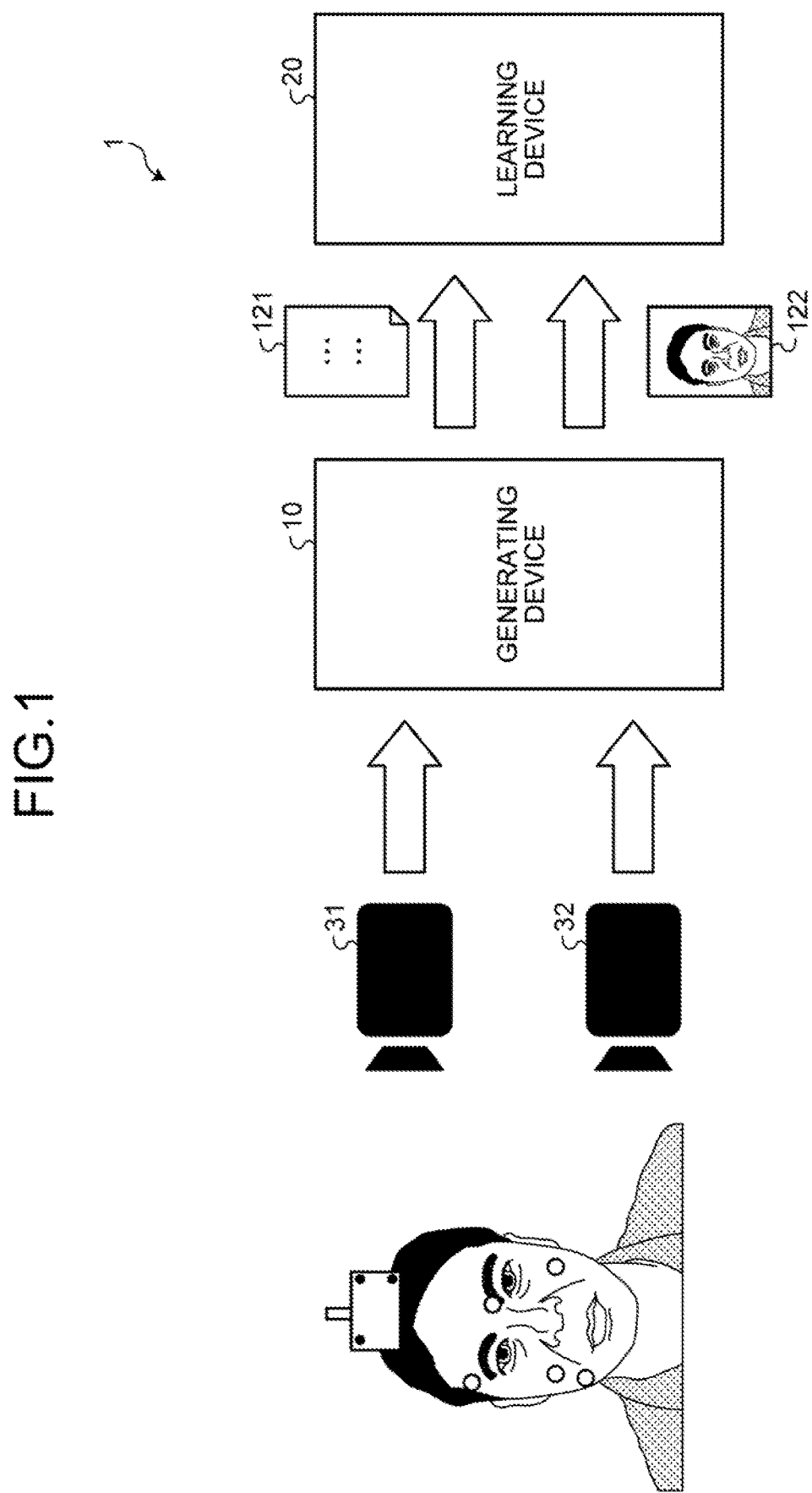
FIG. 1 is a diagram illustrating a configuration of a learning system.

A configuration of a learning system according to an embodiment will be described with reference to FIG. 1. FIG. 1. As illustrated in FIG. X, a learning system 1 includes an RGB (red, green, and blue) camera 31, an infrared (IR) camera 32, a generating device 10, and a learning device 20. Furthermore, the generating device 10 functions as a judgment apparatus.

As illustrated in FIG. 1, first, the RGB camera 31 and the IR camera 32 is oriented toward a human face to which markers are attached. For example, the RGB camera 31 is a general digital camera, receives visible light, and generates images. Furthermore, for example, the IR camera 32 senses infrared light. Furthermore, the markers are, for example, IR reflection (retroreflection) markers. The IR camera 32 can perform motion capture by using IR reflection obtained from markers. Furthermore, in a description below, a person who is an object for capturing an image is referred to as a "subject".

The generating device 10 acquires the results of images captured by the RGB camera 31 and motion captured by the IR camera 32. Then, the generating device 10 outputs, to the learning device 20, an occurrence intensity 121 of each AU and an image 122 in which markers are deleted from the captured image by performing image processing. For example, the occurrence intensity 121 may also be data in which an occurrence intensity of each AU is indicated by five-level evaluation using A to E and annotation, such as "AU 1:2, AU 2:5, and AU 4:1, . . . ", has been performed. The occurrence intensity is not limited to be indicated by five-level evaluation and may also be indicated by, for example, two-level evaluation (presence or absence of occurrence).

The learning device 20 performs machine learning by using the image 122 and the occurrence intensity 121 of each AU output from the generating device 10 and generates, from the image, a model that is used to estimate occurrence intensity of each AU. The learning device 20 can use the occurrence intensity of each AU as a label.

Figure 2:
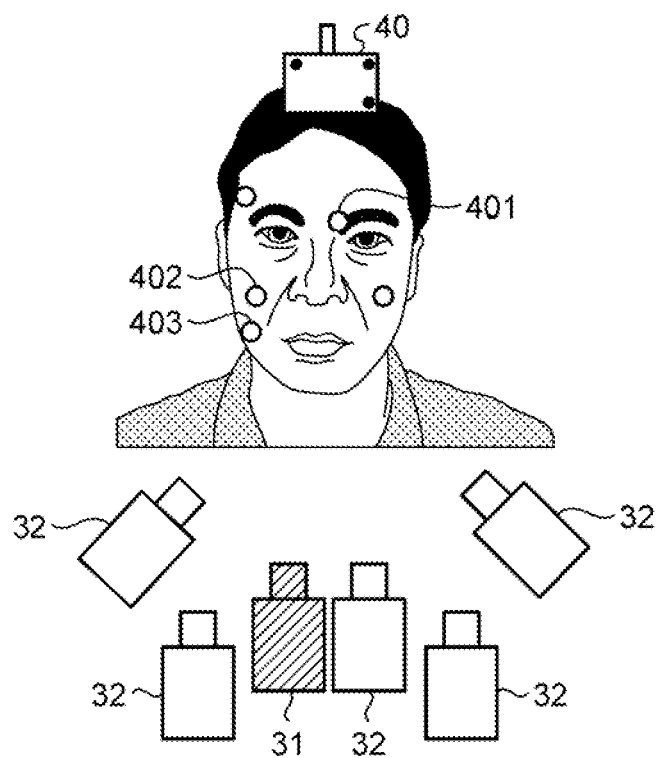
FIG. 2 is a diagram illustrating an arrangement example of cameras.

Here, arrangement of cameras will be described with reference to FIG. 2. FIG. 2 is a diagram illustrating an arrangement example of cameras. As illustrated in FIG. 2, a plurality of the IR cameras 32 may also construct a marker tracking system. In this case, the marker tracking system can detect the positions of IR reflection markers obtained by stereo photography. Furthermore, it is assumed that the relative positional relationship between the plurality of the IR cameras 32 is previously corrected by camera calibration.

Furthermore, a plurality of markers are attached to the face of the subject whose image is captured so as to cover target AUs (for example, an AU 1 to an AU 28). The positions of the markers are changed in accordance with a change in the expression of the subject. For example, a marker 401 is arranged in the vicinity of the root of an eyebrow (glabella). Furthermore, a marker 402 and a marker 403 are arranged in the vicinity of the smile line (nasolabial fold). The markers may also be arranged on the skin associated with one or more AUs and motions of muscles of facial expressions. Furthermore, the markers may also be arranged by avoiding the skin where a change in the texture is large due to, for example, wrinkling.

Furthermore, the subject wears an instrument 40 to which a reference point markers are attached. It is assumed that the positions of the reference point markers attached to the instrument 40 are not changed even if an expression of the subject is changed. Consequently, the generating device 10 can detect a change in the positions of the markers attached to the face based on a change in the relative position from each of the reference point markers. Furthermore, by setting the number of reference point markers to three or more, the generating device 10 can specify the positions of the markers in three-dimensional space.

The instrument 40 is, for example, a headband, and in which the reference point markers are arranged outside the facial contour. Furthermore, the instrument 40 may also be a VR headset, a mask formed of a rigid material, or the like. In this case, the generating device 10 can use the rigid surface of the instrument 40 as the reference point markers.

Figure 3:
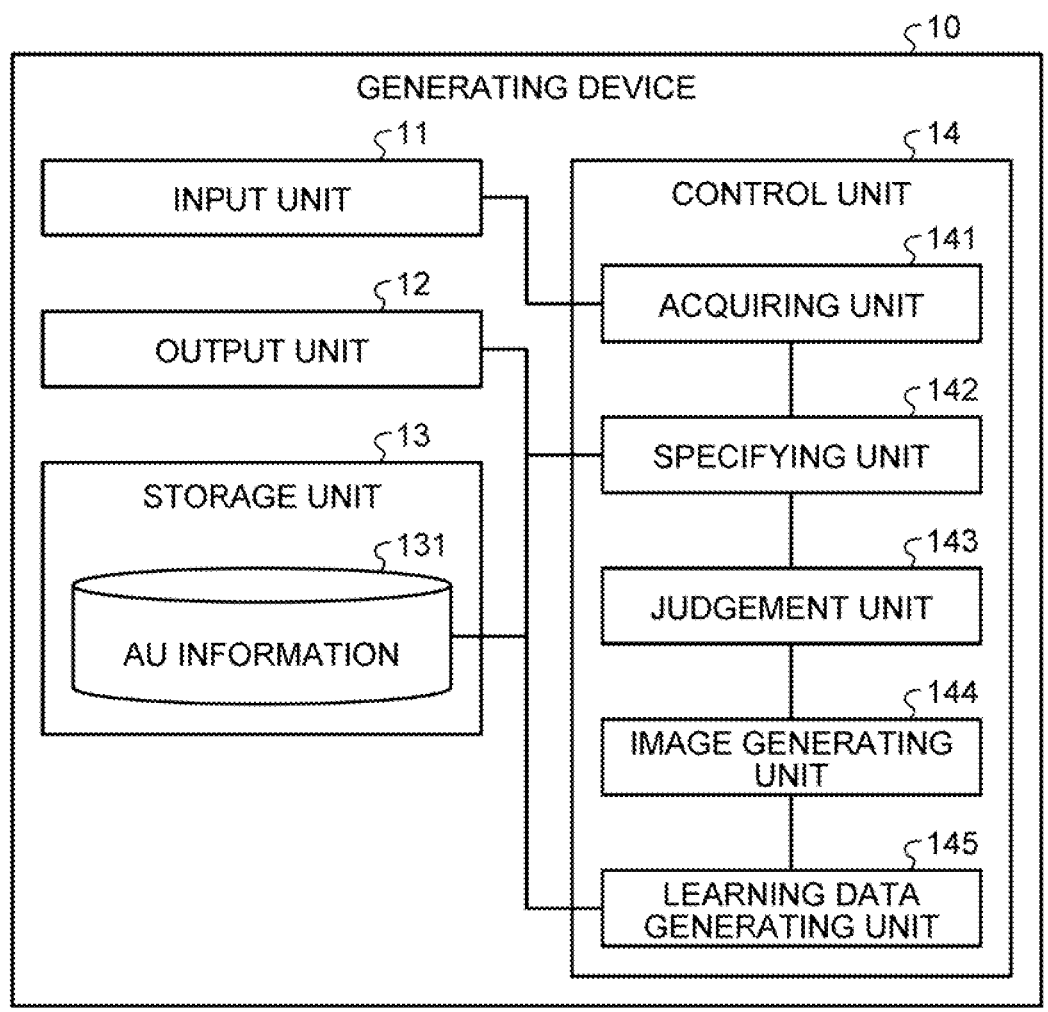
FIG. 3 is a block diagram illustrating a configuration example of a generating device.

A functional configuration of the generating device 10 will be described with reference to FIG. 3. FIG. 3 is a block diagram illustrating a configuration example of the generating device. As illustrated in FIG. 3, the generating device 10 includes an input unit 11, an output unit 12, a storage unit 13, and a control unit 14.

The input unit 11 is an interface that is used to input data. For example, the input unit 11 receives an input of data via an input device, such as a mouse, and a keyboard. Furthermore, the output unit 12 is an interface that is used to output data. For example, the output unit 12 outputs data to an output device, such as a display.

The storage unit 13 is an example of a storage device that stores therein data or programs executed by the control unit 14 and is, for example, a hard disk or a memory. The storage unit 13 stores therein AU information 131. The AU information 131 is information indicating an association relationship between markers and AUs.

The control unit 14 is implemented by, for example, a central processing unit (CPU), a micro processing unit (MPU), a graphics processing unit (GPU), or the like executing, in a RAM as a work area, the program that is stored in an inner storage device. Furthermore, the control unit 14 may also be implemented by for example, an integrated circuit, such as an application specific integrated circuit (ASIC), a field programmable gate array (FPGA), or the like. The control unit 14 includes an acquiring unit 141, a specifying unit 142, a judgment unit 143, an image generating unit 144, and a learning data generating unit 145.

The acquiring unit 141 acquires a captured image including a face. For example, the acquiring unit 141 acquires a captured image including a face to which a plurality of markers are attached at a plurality of positions associated with a plurality of AUs. The acquiring unit 141 acquires images captured by the RGB camera 31.

Here, when an image is captured by the IR cameras 32 and the RGB camera 31, the subject changes expressions. Consequently, the generating device 10 can acquire the state in which the expressions are changed in time series as an image. Furthermore, the RGB camera 31 may also capture a moving image. The moving image is assumed to be a plurality of still images arranged in time series. Furthermore, regarding the subject, expressions may also freely be changed or expressions may also be changed in accordance with a predetermined scenario.

The specifying unit 142 specifies the positions of the markers included in the captured image. The specifying unit 142 specifies each of the positions of the plurality of markers included in the captured image. Furthermore, when a plurality of images are acquired in time series, the specifying unit 342 specifies the positions of the markers in each of the images. Furthermore, the specifying unit 142 can specify the coordinates of each of the markers on a plane or space based on the positional relationship with the reference point markers attached to the instrument 40. Furthermore, the specifying unit 142 may also determine the positions of the markers based on a reference coordinate system or based on a projection position of the reference plane.

The judgment unit 143 judges presence or absence of occurrence of each of the plurality of AUs based on a judgment criterion of the AUs and the positions of the plurality of markers. The judgment unit 143 judges an occurrence intensity related to one or more AUs in which occurrence is present from among the plurality of AUs. At this time, if the judgment unit 143 judges that occurrence is present in an AU associated with a marker from among the plurality of AUs based on the judgment criterion and the position of the marker, the judgment unit 143 can select the AU associated with the subject marker.

For example, the judgment unit 143 judges an occurrence intensity of a first AU based on an amount of movement of a first marker calculated based on a distance between the reference position of the first marker that is associated with the first AU included in the judgment criterion and the position of the first marker specified by the specifying unit 142. Furthermore, it can be said that the first marker is one or a plurality of markers associated with specific AUs.

The judgment criterion of AUs indicates, for example, from among the plurality of markers, one or the plurality of markers used to judge an occurrence intensity of each AU. The judgment criterion of AUs may also include the reference positions of the plurality of markers. Regarding each of the plurality of AUs, the judgment criterion of AUs may also include a relationship (conversion rule) between an occurrence intensity and an amount of movement of a marker that is used to judge the occurrence intensity. Furthermore, the reference positions of the marker may also be determined in accordance with each of the positions of the plurality of markers in a captured image in which the subject is in a lack-of-expression state (occurrence is not present in the AUs).

Figure 4:
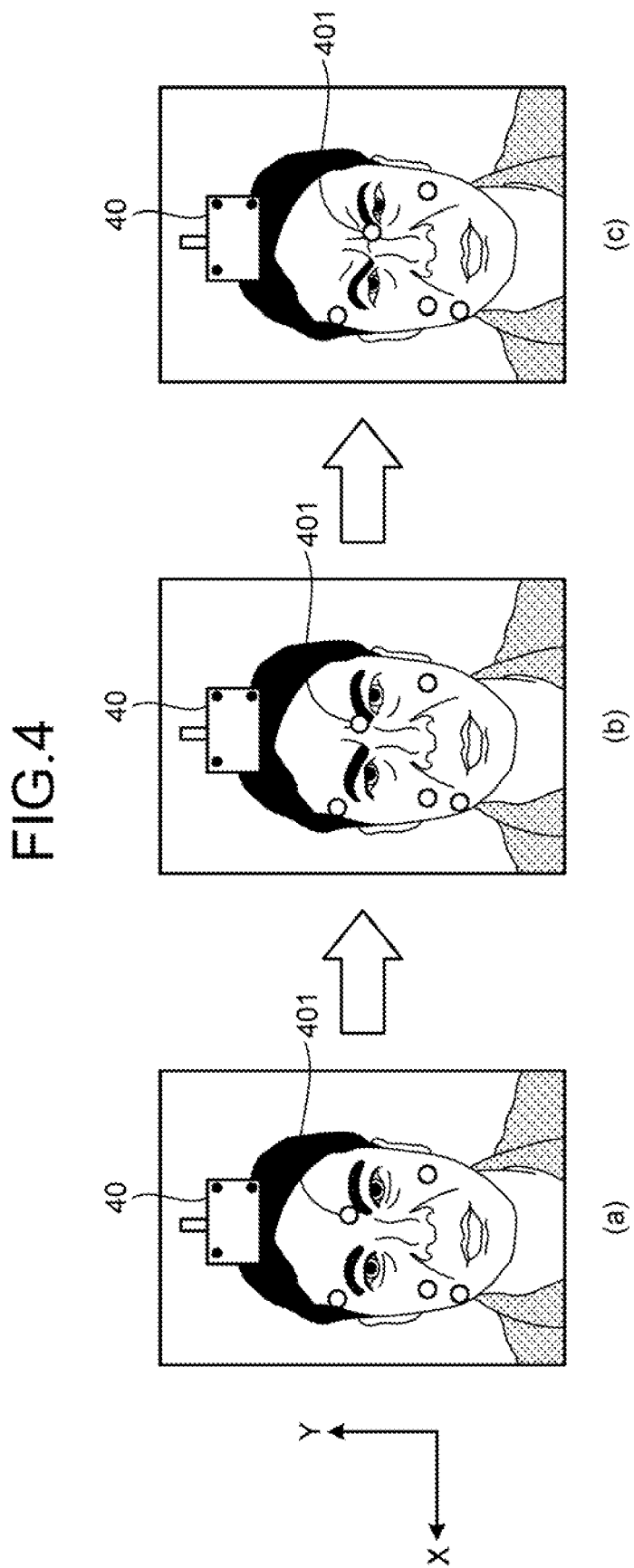
FIG. 4 is a diagram illustrating movements of markers.

Here, movements of markers will be described with reference to FIG. 4. FIG. 4 is a diagram illustrating movements of markers. Images (a), (b), and (c) illustrated in FIG. 4 are images captured by the RGB camera 31. Furthermore, it is assumed that the images are captured in the order of (a), (b), and (c). For example, the image (a) is an image captured when the subject is in a lack-of-expression state. The generating device 10 can recognizes the positions of the markers in the image (a) as the reference positions in which an amount of movements is zero.

As illustrated in FIG. 4, the subject has an expression of pulling the eyebrows together. At this time, the position of the marker 401 is moved in the downward direction in accordance with the change in expression. At this time, the distance between the position of the marker 401 and the reference point marker attached to the instrument 40 is large.

Furthermore, variations in the distance from the reference point marker of the marker 401 in the X direction and the Y direction are represented by the tables illustrated in FIG. 5. FIG. 5 is a diagram illustrating a judgment method of occurrence intensities. As illustrated in FIG. 5, the judgment unit 143 can convert the variations to occurrence intensities. Furthermore, occurrence intensities may also be quantized in five levels in accordance with Facial Action Coding System (FACS) or may also be defined as continuous quantity based on an amount of variation.

Various items can be considered as the rule for the judgment unit 143 converting an amount of variation to each of the occurrence intensities. The judgment unit 143 may also perform conversion in accordance with a predetermined single rule, or may also perform conversion based on a plurality of rules and use the largest occurrence intensity.

For example, the judgment unit 143 may also previously acquire the maximum amount of variation that is an amount of variation obtained when the subject changes its expression to the maximum and convert the occurrence intensities based on the ratio of the amount of variation to the maximum amount of variation. Furthermore, the judgment unit 143 may also determine the maximum amount of variation by using data in which a coder attaches tags by using a related technique. Furthermore, the judgment unit 143 may also linearly convert an amount of variation to each of the occurrence intensities. Furthermore, the judgment unit 143 may also perform conversion by using an approximate expression generated from measurements of a plurality of subjects obtained in advance.

Furthermore, for example, the judgment unit 143 can judge an occurrence intensity based on a movement vector of the first marker calculated based on the position that is previously set as the judgment criterion and the position of the first marker specified by the specifying unit 142. In this case, the judgment unit 143 judges an occurrence intensity of the first AU based on the degree of match between the movement vector of the first marker and the vector that is previously associated with the first AU. Furthermore, the judgment unit 143 may also correct association between the magnitude of the vector and the occurrence intensity by using existing AU estimating engine.

Figure 6:
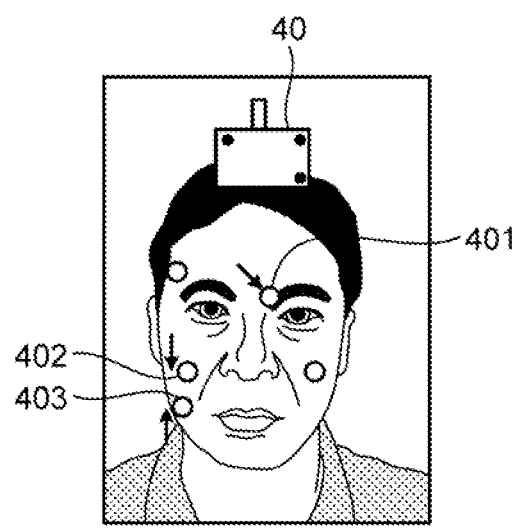
FIG. 6 is a diagram illustrating an example of the judgment method of occurrence intensities.

FIG. 6 is a diagram illustrating an example of the judgment method of occurrence intensities. For example, it is assumed that an AU-4 vector associated with an AU 4 is previously determined as (−2 mm, −6 mm). At this time, the judgment unit 143 calculates an inner product of the movement vector and the AU-4 vector of the marker 401 and normalizes the calculation result by the magnitude of the AU-4 vector. Here, if the inner product matches the magnitude of the AU-4 vector, the judgment unit 143 judges an occurrence intensity of the AU 4 as the fifth level out of five levels. In contrast, if the inner product is a half of the AU-4 vector, for example, in a case of the linear conversion rule described above, the judgment unit 143 judges the occurrence intensity of the AU 4 as the third level out of five levels.

Furthermore, for example, as illustrated in FIG. 6, it is assumed that the magnitude of an AU-11 vector associated with an AU 11 is set to 3 mm. At this time, when an amount of variation in a distance between the marker 402 and the marker 403 matches the magnitude of the AU-11 vector, the judgment unit 143 judges that the occurrence intensity of the AU 11 is the fifth level out of the five levels. In contrast, when an amount of variation in distance is a half of the AU-4 vector, for example, in a case of the linear conversion rule described above, the judgment unit 143 judges that the occurrence intensity of the AU 11 is the third level out of the five levels. In this way, the judgment unit 143 can judge the occurrence intensity based on the variation in the distance between the position of the first marker and the position of the second marker specified by the specifying unit 142.

Furthermore, the generating device 10 may also output an occurrence intensity by associating the occurrence intensity with the image that has been subjected to image processing. In this case, the image generating unit 144 generates an image by performing image processing in which a marker is deleted from a captured image.

Figure 7:
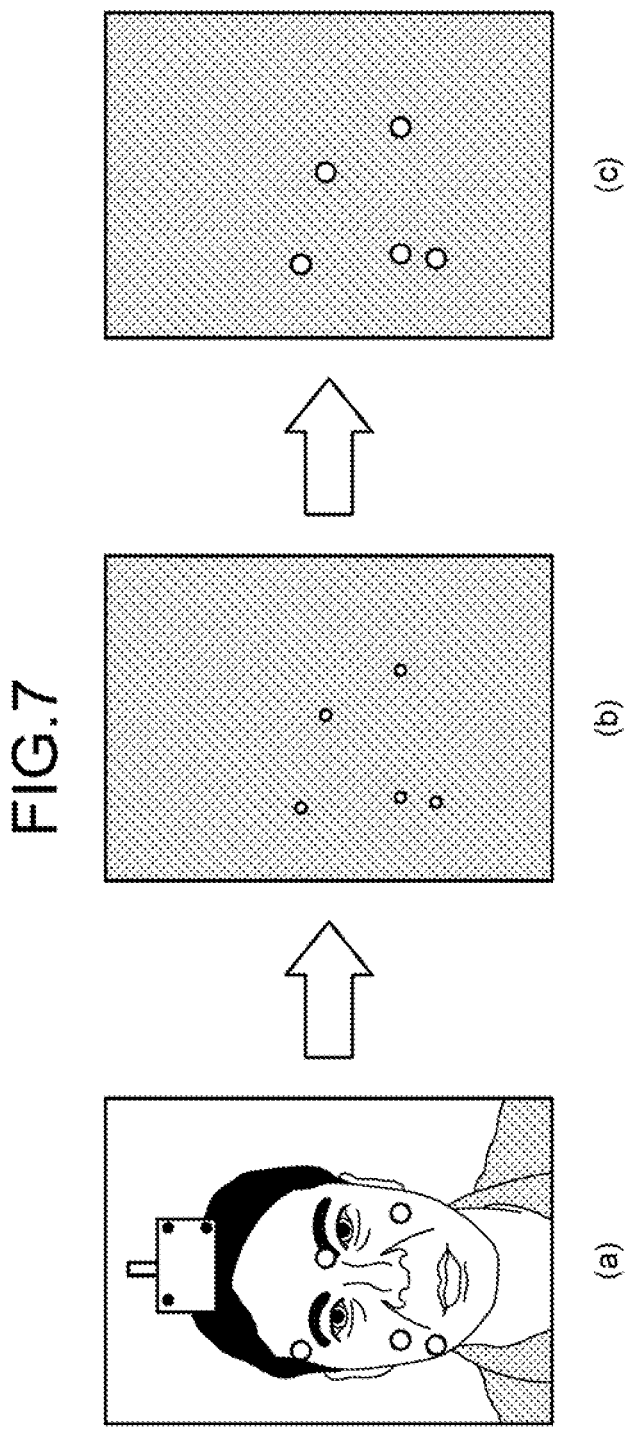
FIG. 7 is a diagram illustrating a generating method of a mask image.

The image generating unit 144 can delete a marker by using a mask image. FIG. 7 is a diagram illustrating a generating method of a mask image. The image (a) illustrated in FIG. 7 is an image captured by the RGB camera 31. First, the image generating unit 144 extracts the color of each marker that has been intentionally attached, and then defines the extracted color as a representative color. Then, as indicated by (b) illustrated in FIG. 7, the image generating unit 144 generates an area image in color. Furthermore, as indicated by (c) illustrated in FIG. 7, the image generating unit 144 performs a process, such as contraction, expansion, on the color area in the vicinity of the representative color and generates a mask image that is used to delete the markers. Furthermore, accuracy of extracting the color of each marker may also be improved, by setting the color of each marker to the color that is rare as the color of a face.

Figure 8:
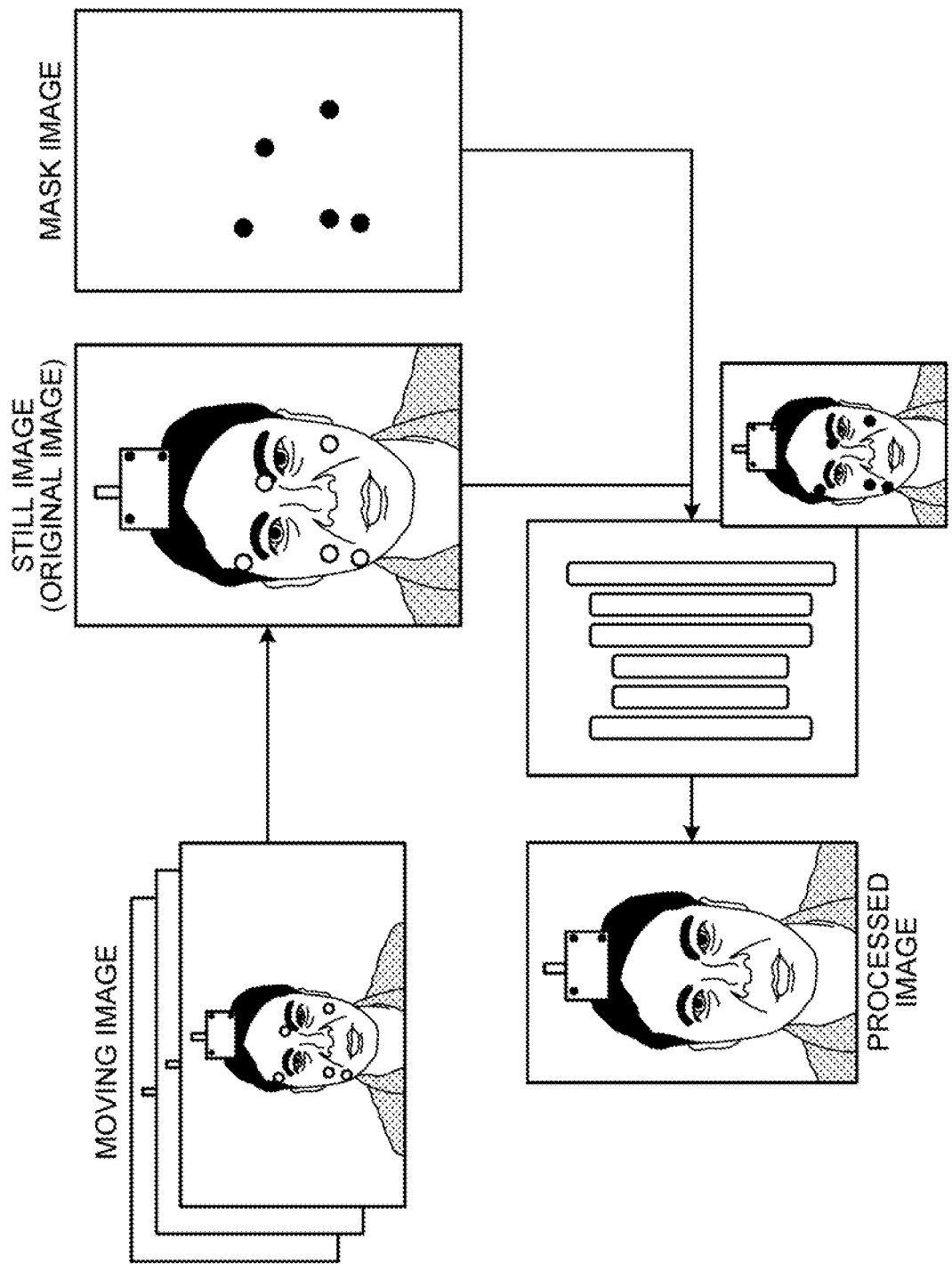
FIG. 8 is a diagram illustrating a deletion method of the marker.

FIG. 8 is a diagram illustrating a deletion method of the marker. As illustrated in FIG. 8, first, the image generating unit 144 applies a still image, which has been acquired from a moving image, to a mask image. Furthermore, the image generating unit 144 inputs the image in which the mask image is applied to, for example, a neural network and obtains a processed image. Furthermore, it is assumed that learning has been performed on the neural network by using an image of a subject with a mask, without a mask, or the like. Furthermore, by acquiring the still image from the moving image, it is possible to obtain data indicating the middle of a change in the expression, and it is also possible to obtain a large amount of data in a short time, which are merits. Furthermore, the image generating unit 144 may also use, as the neural network, generative multi-column convolutional neural networks (GMCNN) or generative adversarial networks (GAN).

Furthermore, the method of deleting markers performed by the image generating unit 144 is not limited to the method described above. For example, the image generating unit 144 may also detect a position of a marker based on the shape of a predetermined marker and generate a mask image. Furthermore, it may also be possible to previously perform calibration on the relative positions of the IR cameras 32 and the RGB camera 31. In this case, the image generating unit 144 can detect the position of the marker from the information on a marker tracking received from the IR cameras 32.

Furthermore, the image generating unit 144 may also use different detecting methods depending on markers. For example, for a marker above a nose, a movement is small and it is thus possible to easily recognize the shape; therefore, the image generating unit 144 may also detect the position by recognizing the shape. Furthermore, for a marker besides a mouth, it is difficult to recognize the shape; therefore, the image generating unit 144 may also detect the position by using a method of extracting the representative color.

The learning data generating unit 145 generates learning data for machine learning by attaching information related to the first AU to the generated image. For example, the learning data generating unit 145 generates learning data for machine learning by attaching the occurrence intensity of the first AU judged by the judgment unit 143 to the generated image. Furthermore, the learning device 20 may also perform learning by adding the learning data generated by the learning data generating unit 145 to existing learning data.

According to the embodiment, it is possible to estimate learning data needed. In general, an enormous amount of calculation cost is needed to perform machine learning. For the calculation cost, the usage of time, GPU, and the like is included.

If the quality and the amount of data sets are improved, the accuracy of a model obtained by learning is improved. Consequently, if it is possible to, in advance, roughly estimate the quality and the amount of data sets with respect to the target accuracy, the calculation cost is reduced. Here, for example, the quality of data sets is a deletion rate and deletion accuracy of markers. Furthermore, for example, the amount of data sets is the number of data sets and subjects.

Among the combination of AUs, there may be a combination having a high correlation. Consequently, it is assumed that an estimation performed with respect to a certain AU can be applied to another AU having a high correlation with that AU. For example, it is known that an AU 18 have a high correlation with an AU 22 and an associated marker may possibly be common. Consequently, if it is possible to estimate data sets having the quality and the amount enough to reach the target, of the estimation accuracy of the AU 18, it is possible to roughly estimate the quality and the amount of data sets enough to reach the target of the estimation accuracy of the AU 22.

The learning device 20 performs machine learning by using learning data generated by the generating device 10, and then generates a model for estimating an occurrence intensity of each AU from an image. Furthermore, an estimating device 60 actually performs estimation by using the model generated by the learning device 20.

Figure 9:
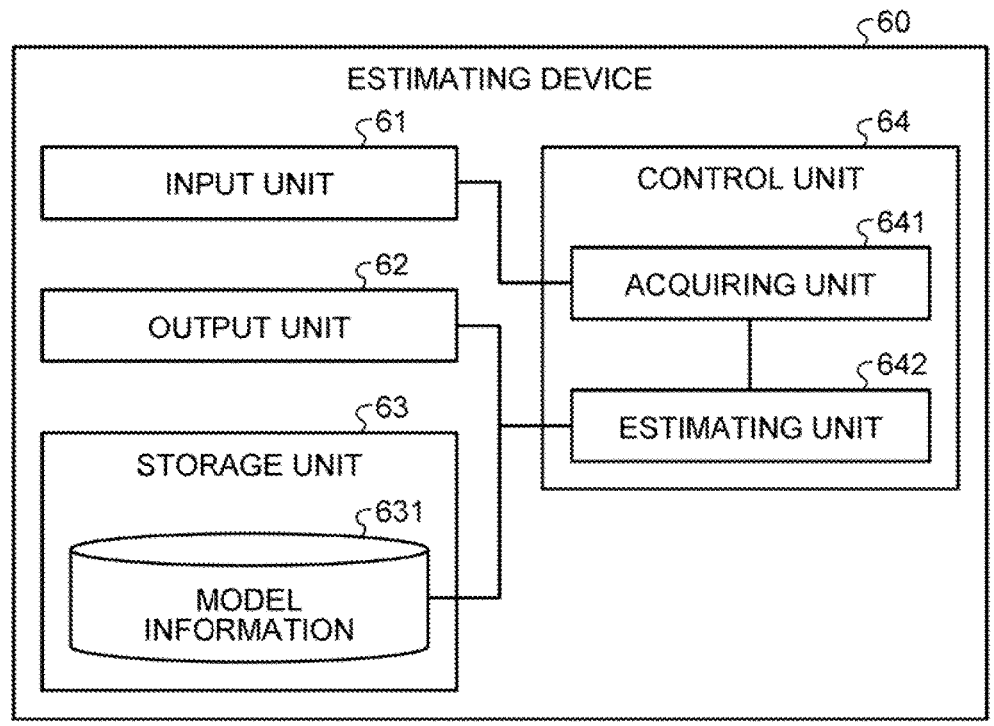
FIG. 9 is a block diagram illustrating a configuration example of an estimating device.

A functional configuration of the estimating device 60 will be described with reference to FIG. 9. FIG. 9 is a block diagram illustrating a configuration example of the estimating device. As illustrated in FIG. 9, the estimating device 60 includes an input unit 61, an output unit 62, a storage unit 63, and a control unit 64.

The input unit 61 is a device or an interface for inputting data. For example, the input unit 61 is a mouse and a keyboard. Furthermore, the output unit 62 is a device or an interface for outputting data. For example, the output unit 62 is a display or the like that is used to display a screen.

The storage unit 63 is an example of a storage device that stores therein data or programs or the like executed by the control unit 64 and is, for example, a hard disk or a memory. The storage unit 63 stores therein model information 631. The model information 631 parameters or the like that constructs a model generated by the learning device 20.

The control unit 64 is implemented by, for example, a CPU, an MPU, a GPU, or the like executing, in a RAM as a work area, the program that is stored in an inner storage device. Furthermore, the control unit 64 may also be implemented by, tor example, an integrated circuit, such as an ASIC, an FPGA, or the like. The control unit 64 includes an acquiring unit 641 and an estimating unit 642.

The acquiring unit 641 acquires a first captured image that includes a face. For example, the first, image is an image in which a face of a person is captured and an occurrence intensity of each AU is unknown.

The estimating unit 642 inputs the first captured image to a machine learning model that is generated from machine learning performed based on learning data in which information on the first AU selected based on the judgment criterion of each AU and a position of each marker included in the captured image. Then, the estimating unit 642 acquires an output of the machine learning model as the estimation result of the expression of the face.

For example, the estimating unit 642 acquires data, such as "AU 1:2, AU 2:5, AU 4:1, . . . ", expressed by a five-level evaluation in which an occurrence intensity of each AU are indicated by A to B. Furthermore, the output unit 12 outputs the estimation result acquired by the estimating unit 642.

Figure 10:
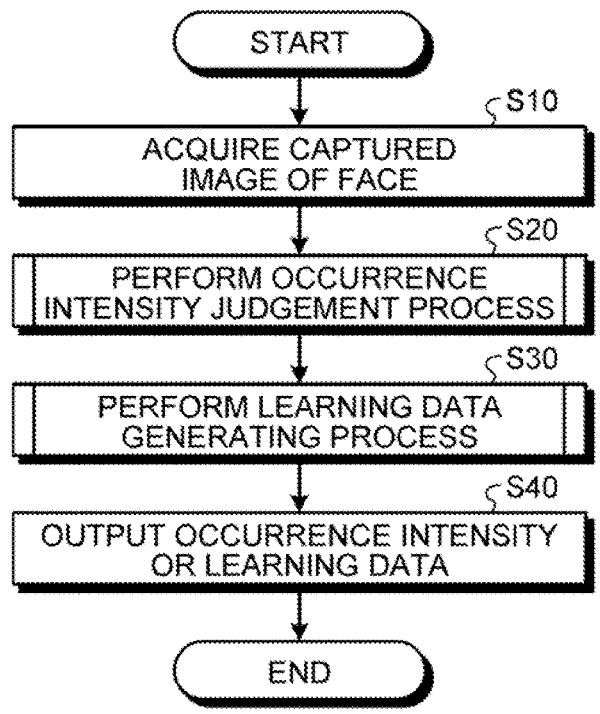
FIG. 10 is a flowchart illustrating the flow of a process performed by the generating device.

The flow of a process performed by the generating device 10 will be described with reference to FIG. 10. FIG. 10 is a flowchart illustrating the flow of a process performed by the generating device. As illustrated in FIG. 10, first, the generating device 10 acquires a captured image of a face of a subject (Step S10). Then, the generating device 10 performs an occurrence intensity judgment process (Step S20). Then, the generating device 10 performs a learning data generating process (Step S30). Then, the generating device 10 outputs the occurrence intensity or learning data (Step S40). The generating device 10 may also output only the occurrence intensity or may also output data having a predetermined format in which the captured image is associated with the occurrence intensity. Furthermore, if a marker image is obtained, it is possible to perform the process at Step S20; therefore, the generating device 10 may also perform the processes at Steps S10 and S20 in parallel.

Figure 11:
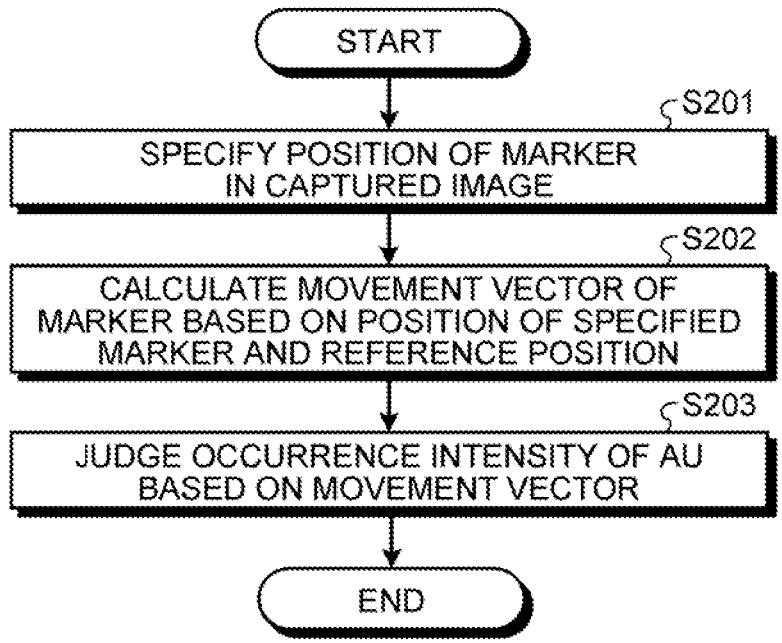
FIG. 11 is a flowchart illustrating the flow of an occurrence intensity judgment process.

The flow of the occurrence intensity judgment process (Step S20 in FIG. 10) will be described with reference to FIG. 11. FIG. 11 is a flowchart illustrating the flow of the occurrence intensity judgment process. As illustrated in FIG. 11, first, the generating device 10 specifies a position of a marker in the captured image (Step S201).

Then, the generating device 10 calculates a movement vector of the marker based on the position of the specified marker and the reference position (Step S202). Then, the generating device 10 judges the occurrence intensity of the AU based on the movement vector (Step S203).

Figure 12:
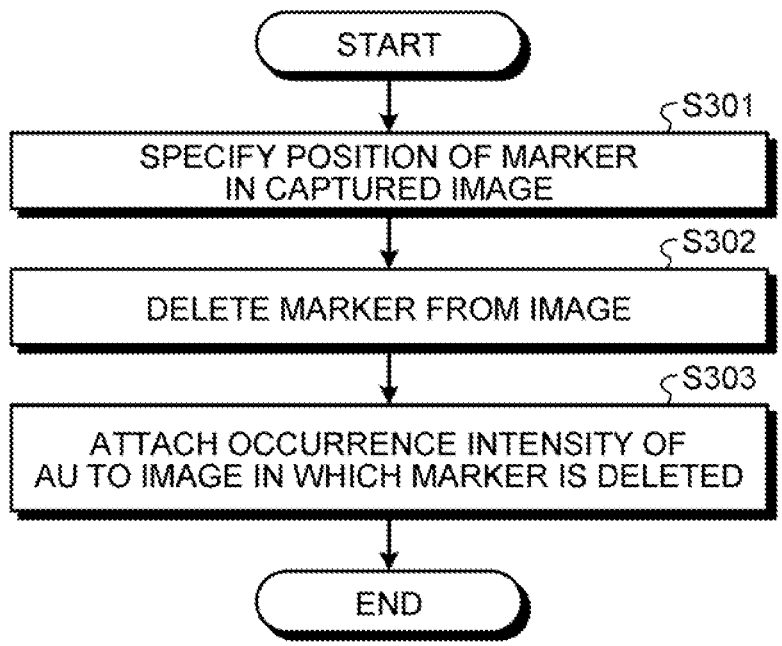
FIG. 12 is a flowchart illustrating the flow of a generating process performed on learning data.

The flow of a learning data generating process will be described with reference to FIG. 12. FIG. 12 is a flowchart illustrating the flow of the learning data generating process. As illustrated in FIG. 12, first, the generating device 10 specifies the position of the marker in the captured image (Step S301). The generation device 10 deletes a marker from the image (Step S302). Then, the generating device 10 attaches the occurrence intensity of the AU to the image in which the marker is deleted (Step S303).

As described above, the acquiring unit 141 in the generating device 10 acquires a captured image including a face to which a plurality of markers are attached at a plurality of positions that are associated with a plurality of AUs. The specifying unit 142 specifies each of the positions of the plurality of markers included in the captured image. The judgment unit 143 judges an occurrence intensity of a specific AU based on a judgment criterion of the specific AU selected from the plurality of AUs and positions of one or the plurality of markers, from among the plurality of markers, associated with the specific AU. The output unit 12 outputs the occurrence intensity of the specific AU by associating the occurrence intensity with the captured image. In this way, the generating device 10 can judge the occurrence intensity of the specific AU from the captured image without annotating performed by a coder. Consequently, it is possible to generate teacher data for estimating AUs.

The judgment unit 143 judges the occurrence intensity based on an amount of movement of the marker calculated based on the distance between the position that is previously set as the judgment criterion and the position of one or a plurality of markers specified by the specifying unit 142. In this way, the generating device 10 can calculate the occurrence intensity of each AU with high accuracy by using the judgment criterion.

The judgment unit 143 judges the occurrence intensity of the specific AU based on the degree of match between a vector that is previously associated with the specific AU and a movement vector of one or the plurality of markers calculated based on the position that is previously set as the judgment criterion and the position of the first, marker specified by the specifying unit 142. In this way, by calculating the movement vector, the generating device 10 can evaluate the movement of the marker including directions and improve the judgment accuracy of the occurrence intensity.

The judgment unit 143 judges the occurrence intensity based on a change in the distance between the position of the first marker specified by the specifying unit 142 and the position of the second marker. In this way, by using the positions of the plurality of markers, the generating device 10 can cope with a complicated movement of a marker caused by a change in the surface texture of the face.

As described above, the acquiring unit 141 in the generating device 10 acquires a captured image including a face. The specifying unit 142 specifies the positions of the markers included in the captured image. The judgment unit 143 selects the first AU from among the plurality of AUs based on the judgment criterion of the AUs and the position of the specified marker. The image generating unit 144 generates an image by performing the image processing for deleting a marker from the captured image. The learning data generating unit 145 generates learning data for machine learning by attaching information on the first AU to the generated image. In this way, the generating device 10 can automatically obtain learning data with high quality in which the marker is deleted. Consequently, according to the embodiment, it is possible to generate teacher data for estimating AUs.

When it is judged that the AU associated with the marker from among the plurality of AUs is present based on the judgment criterion and the position of the marker, the judgment unit 143 selects the subject AU. In this way, the judgment unit 143 can judge the AU associated with the marker.

The judgment unit 143 judges the occurrence intensity of the AU based on an amount of movement of the marker calculated based on the distance between the reference position of a marker included in the judgment criterion and the position of the specified marker. In this way, the judgment unit 143 can judge the AU based on the distance.

The acquiring unit 641 in the estimating device 60 acquires the first captured image including a face. The estimating unit 642 inputs the first captured image to a machine learning model that is generated from machine learning based on learning data in which information on the first AU selected based on the judgment criterion of the AUs and the positions of the markers included in the captured image is used as a teacher label. The estimating unit 642 acquires an output of the machine learning model as the estimation result of the expression of the face. In this way, the estimating device 60 can perform estimation with high accuracy by using the model generated at low-cost.

In the embodiment described above, a description has been given with the assumption that the judgment unit 143 judges an occurrence intensity of each AU based on an amount of movement of each marker. In addition, a state in which a marker that does not move may also be used as the judgment criterion of the occurrence intensity judged by the judgment unit 143.

Furthermore, a color that is easily detected may also be arranged around the marker. For example, a green round adhesive seal in which an IR marker is placed at the center may also be attached to a subject. In this case, the image generating unit 144 can detect a green round area from the captured image and delete the area together with the IR marker.

The flow of the processes, the control procedures, the specific names, and the information containing various kinds of data or parameters indicated in the above specification and drawings can be arbitrarily changed unless otherwise stated. Specific examples, distributions, values, and the like described in the embodiment are only examples and can be arbitrarily changed.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, ail or any part of each of the processing functions performed by the each of the devices can be implemented by a CPU and by programs analyzed and executed by the CPU or implemented as hardware by wired logic.

Figure 13:
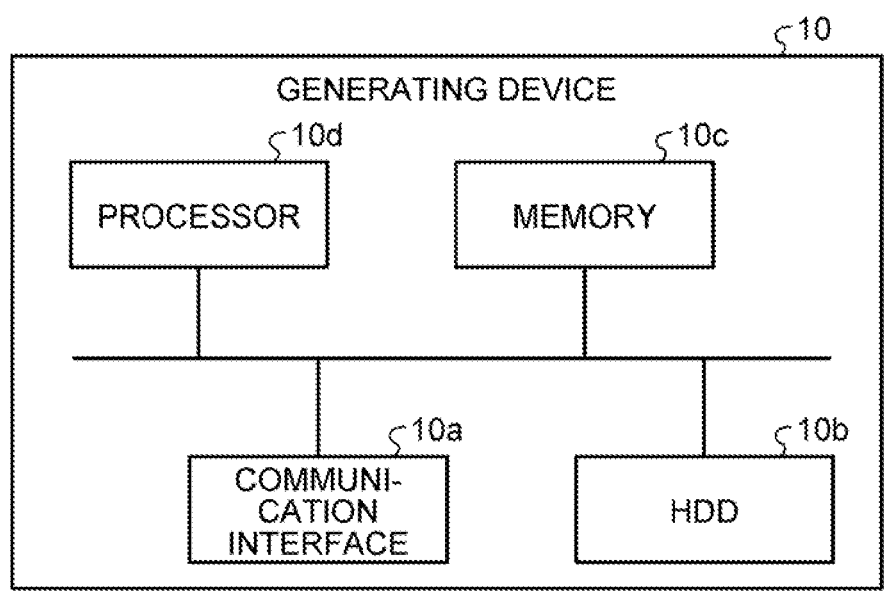
FIG. 13 is a diagram illustrating a hardware configuration example.

FIG. 13 is a diagram illustrating a hardware configuration example. As illustrated in FIG. 11, the generating device 10 includes a communication interface 10a, a hard disk drive (HDD) 10b, a memory 10c, and a processor 10d. Furthermore, each of the units illustrated in FIG. 13 is mutually connected by a bus or the like.

The communication interface 10a is a network interface card and the like and communicates with other server. The HDD 10b stores therein the programs and DBs that operate the functions illustrated in FIG. 3.

by reading the program that executes the same process as that performed by each of the processing units illustrated in FIG. 2 from the HDD 10b or the like and loading the read programs in the memory 10c, the processor 10d, which is a hardware circuit, operates the process that executes each of the functions described with reference to FIG. 3. Namely, the process executes the same function as that performed by each of the processing unit included in the generating device 10. Specifically, the processor 10d reads, from the HDD 10b or the like, the program having the same function as that performed by the acquiring unit 141, the specifying unit 142, the judgment unit 143, the image generating unit 144, and the learning data generating unit 145. Then, the processor 10d executes the process that executes the same processes as those performed by the acquiring unit 141, the specifying unit 142, the judgment unit 143, the image generating unit 144, and the learning data generating unit 145.

In this way, by reading and executing the programs, the generating device 10 is operated as an information processing apparatus that executes a learning method. Furthermore, the generating device 10 can also implement the same function as that described above in the embodiments by reading the programs described above from a recording medium by a medium reading device and executing the read programs described above. Furthermore, the programs described in the other embodiment are not limited to be executed by the generating device 10. For example, the present invention may also be similarly used in a case in which another computer or a server executes a program or in a case in which another computer and a server cooperatively execute the program with each other.

These programs can be distributed via a network, such as the Internet. Furthermore, these programs can be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

According to an aspect of the present invention, it is possible to judge AUs from a facial image.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein instructions executable by one or more computers, the instructions comprising:
    instructions for acquiring a captured image including a face to which a plurality of markers and a reference marker are attached at a plurality of positions associated with a plurality of action units;
    instructions for detecting each of the positions of the plurality of markers with reference to the reference marker whose position is not changed in the captured image;
    instructions for judging an occurrence intensity of a first action unit associated with a first marker of the plurality of action units in accordance with a judgment criterion of an action unit and a position of the first marker; and
    instructions for outputting the occurrence intensity of the first action unit in association with the captured image, wherein
    the judging includes judging the occurrence intensity of the first action unit in accordance with an amount of movement of the first marker calculated based on a distance between a reference position of the first marker included in the judgment criterion and the position of the first marker, or
    judging the occurrence intensity of the first action unit in accordance with a degree of match between a movement vector of the first marker and a reference vector of the first action unit included in the judgment criterion, the movement vector being calculated based on the reference position of the first marker included in the judgment criterion and the position of the first marker.

2. The non-transitory computer-readable recording medium according to claim 1, wherein the judging includes judging the occurrence intensity of the first action unit in accordance with the judgment criterion, the position of the first marker, and a position of a second marker included in the plurality of markers.

3. The non-transitory computer-readable recording medium according to claim 1, wherein the instructions further includes instructions for judging an occurrence intensity of a second action unit from among the plurality of action units in accordance with a change in a distance between the position of the first marker and a position of a second marker included in the plurality of markers.

4. A computer-implemented judgement method comprising:
    acquiring a captured image including a face to which a plurality of markers and a reference marker are attached at a plurality of positions associated with a plurality of action units;
    detecting each of the positions of the plurality of markers with reference to the reference marker whose position is not changed in the captured image;
    judging an occurrence intensity of a first action unit associated with a first marker of the plurality of action units in accordance with a judgment criterion of an action unit and a position of the first marker; and
    outputting the occurrence intensity of the first action unit in association with the captured image, wherein
    the judging includes judging the occurrence intensity of the first action unit in accordance with an amount of movement of the first marker calculated based on a distance between a reference position of the first marker included in the judgment criterion and the position of the first marker, or
    judging the occurrence intensity of the first action unit in accordance with a degree of match between a movement vector of the first marker and a reference vector of the first action unit included in the judgment criterion, the movement vector being calculated based on the reference position of the first marker included in the judgment criterion and the position of the first marker.

5. The computer-implemented judgement method according to claim 4, wherein the judging includes judging the occurrence intensity of the first action unit in accordance with the judgment criterion, the position of the first marker, and a position of a second marker included in the plurality of markers.

6. The computer-implemented judgement method according to claim 4, further including judging an occurrence intensity of a second action unit from among the plurality of action units in accordance with a change in the distance between a position of the first marker and a position of a second marker included in the plurality of markers.

7. A judgement apparatus comprising:
one or more memories; and
one or more processors coupled to the one or more memories and the one or more processors configured to:
acquire a captured image including a face to which a plurality of markers and a reference marker are attached at a plurality of positions associated with a plurality of action units;
detect each of the positions of the plurality of markers with reference to the reference marker whose position is not changed in the captured image;
judge an occurrence intensity of a first action unit associated with a first marker of the plurality of action units in accordance with a judgment criterion of an action unit and a position of the first marker; and
output the occurrence intensity of the first action unit in association with the captured image, wherein the judging includes judging the occurrence intensity of the first action unit in accordance with an amount of movement of the first marker calculated based on a distance between a reference position of the first marker included in the judgment criterion and the position of the first marker, or
judging the occurrence intensity of the first action unit in accordance with a degree of match between a movement vector of the first marker and a reference vector of the first action unit included in the judgment criterion, the movement vector being calculated based on the reference position of the first marker included in the judgment criterion and the position of the first marker.

8. The judgement apparatus according to claim 7, wherein the one or more processors are further configured to judge the occurrence intensity of the first action unit in accordance with the judgment criterion, the position of the first marker, and a position of a second marker included in the plurality of markers.

9. The judgement apparatus according to claim 7, wherein the one or more processors are further configured to judge an occurrence intensity of a second action unit from among the plurality of action units in accordance with a change in a distance between the position of the first marker and a position of a second marker included in the plurality of markers.

* * * * *